(12) United States Patent
Denhard et al.

(10) Patent No.: US 11,703,096 B2
(45) Date of Patent: Jul. 18, 2023

(54) MOTOR-VEHICLE FIXED-CALIPER PARTIALLY LINED DISK BRAKE WITH A SHEET-STEEL BOW-TYPE CLEARANCE SPRING (71) Applicant: Continental Teves AG & Co. oHG, Frankfurt (DE)

(72) Inventors: Werner Denhard, Frankfurt (DE); Valentin Hummel, Frankfurt (DE)

(73) Assignee: Continental Teves AG & Co. OHG, Frankfurt am Main (DE)

(*) Notice: Subject to any disclaimer, the term of this patent is extended or adjusted under 35 U.S.C. 154(b) by 0 days.

(21) Appl. No.: 16/512,666

(22) Filed: Jul. 16, 2019

(65) Prior Publication Data
US 2019/0338816 A1 Nov. 7, 2019

Related U.S. Application Data (63) Continuation of application No. PCT/EP2018/052246, filed on Jan. 30, 2018.

(30) Foreign Application Priority Data

Jan. 31, 2017 (DE) ...................... 10 2017 201 553.5
Dec. 13, 2017 (DE) ...................... 10 2017 222 639.0

(51) Int. Cl.
F16D 65/40 (2006.01)
F16D 65/097 (2006.01)
F16D 55/228 (2006.01)
F16D 127/02 (2012.01)

(52) U.S. Cl.
CPC ......... F16D 65/097 (2013.01); F16D 55/228 (2013.01); F16D 2127/02 (2013.01)

(58) Field of Classification Search
CPC ............... F16D 65/097; F16D 65/0976; F16D 65/0977; F16D 65/224; F16D 65/40
USPC .......................... 188/72.5, 73.36–73.38, 370
See application file for complete search history.

(56) References Cited

U.S. PATENT DOCUMENTS

| 4,417,647 | A |   | 11/1983 | Cotter et al. |
| 4,658,938 | A | * | 4/1987 | Thiel ................... F16D 65/0977 188/73.35 |
| 5,310,024 | A |   | 5/1994 | Takagi |
| 5,538,103 | A |   | 7/1996 | Rueckert et al. |
| 6,173,819 | B1 | * | 1/2001 | Meiss ................... F16D 55/224 188/370 |

(Continued)

FOREIGN PATENT DOCUMENTS

| CN | 1392353 A | 1/2003 |
| CN | 101427044 A | 5/2009 |

(Continued)

OTHER PUBLICATIONS

Search Report dated Jun. 2, 2020 from corresponding German Patent Application No. DE 10 2017 222 639.0.

(Continued)

*Primary Examiner* — Christopher P Schwartz (57) ABSTRACT

A motor-vehicle fixed-caliper partially lined disk brake with pin mounting for backing plates of disk brake linings, comprising a one-piece clearance spring with two spring legs which are elastically clamped in between the backing plates on a bearing portion which is free of friction material.

16 Claims, 5 Drawing Sheets (56) References Cited

U.S. PATENT DOCUMENTS

| | | | | |
|---|---|---|---|---|
| 7,905,334 | B2* | 3/2011 | Reuter | F16D 65/0976 188/73.38 |
| 8,016,085 | B2* | 9/2011 | Keller | F16D 65/0977 188/73.38 |
| 8,636,119 | B2* | 1/2014 | Bach | F16D 65/097 188/72.3 |
| 9,261,152 | B2 | 2/2016 | Gutelius et al. | |
| 10,670,093 | B2* | 6/2020 | Dreher | F16D 65/092 |
| 2003/0192749 | A1 | 10/2003 | Barbosa et al. | |
| 2004/0104086 | A1 | 6/2004 | Katoh | |
| 2007/0137950 | A1 | 6/2007 | Jen et al. | |
| 2009/0236187 | A1 | 9/2009 | Bach et al. | |
| 2011/0100767 | A1 | 5/2011 | Wan | |
| 2012/0090927 | A1 | 4/2012 | Bach et al. | |
| 2016/0053837 | A1 | 2/2016 | Lou et al. | |
| 2016/0215837 | A1 | 7/2016 | Cleary et al. | |
| 2018/0106308 | A1 | 4/2018 | Fricke et al. | |
| 2018/0106309 | A1 | 4/2018 | Fricke et al. | |
| 2018/0106313 | A1 | 4/2018 | Fricke et al. | |
| 2018/0195569 | A1 | 7/2018 | Dreher et al. | |

FOREIGN PATENT DOCUMENTS

| | | | |
|---|---|---|---|
| CN | 102362088 | A | 2/2012 |
| CN | 104819229 | A | 8/2015 |
| CN | 104819929 | A | 8/2015 |
| DE | 2536619 | A | 2/1977 |
| DE | 3124631 | A1 | 1/1983 |
| DE | 4301621 | A1 | 8/1993 |
| DE | 4332713 | A1 | 3/1995 |
| DE | 202015104454 | U1 | 10/2015 |
| DE | 10 2016 102686 | U1 | 6/2016 |
| DE | 102017204696 | A1 | 9/2018 |
| EP | 1353084 | B1 | 10/2003 |
| EP | 3051164 | A1 | 8/2016 |
| JP | 2005140227 | A | 6/2005 |
| JP | 2011033130 | A | 2/2011 |
| JP | 2012072830 | A | 4/2012 |
| JP | 2012189188 | A | 10/2012 |
| JP | 5244731 | B2 | 7/2013 |
| KR | 20030067836 | A | 8/2003 |
| KR | 20050114792 | A | 12/2005 |
| WO | 2017036802 | A1 | 3/2017 |

OTHER PUBLICATIONS

International Search Report and Written Opinion dated May 9, 2018 from corresponding International Patent Application No. PCT/EP2018/052246.
Japanese Notice of Reasons for Refusal drafted on Mar. 4, 2021 for the counterpart Japanese Patent Application No. 2019-534844.
Korean Notice to Submit Response dated Apr. 13, 2021 for the counterpart Korean Patent Application No. 10-2019-7025188.
Karlheinz Roth, "Designing with Design Catalogs", vol. 3: Connections and Encoding, Finding a Solution, ISBN 978-3-642-87220-4, ISBN 978-3-642-87219-8 (eBook) DOI 10.1007/978-3-642-87219-8.
Word translation of Karlheinz Roth, "Designing with Design Catalogs", vol. 3: Connections and Encoding, Finding a Solution.

* cited by examiner

MOTOR-VEHICLE FIXED-CALIPER PARTIALLY LINED DISK BRAKE WITH A SHEET-STEEL BOW-TYPE CLEARANCE SPRING

This application claims the benefit of PCT Application PCT/EP2018/052246, filed Jan. 30, 2018, which claims priority to German Application DE 10 2017 201 553.5, filed Jan. 31, 2017 and German Application DE 10 2017 222 639.0, filed Dec. 13, 2017. The disclosures of the above applications are incorporated herein by reference.

TECHNICAL FIELD

NOM A motor-vehicle fixed-caliper partially lined disk brake with a one-piece clearance spring.

TECHNICAL BACKGROUND

A motor-vehicle fixed-caliper partially lined disk brake of the type in question comprises a pin mounting for adjacent partial-lining disk brake linings, comprising a one-piece clearance spring with two spring legs which are clamped in elastically in a floating manner between backing plate portions which are free of friction material. Partial-lining disk brake linings have been used for some time in motor-vehicle brake assemblies. One skilled in the art would be able to recognize the particular partial-lining design for an exemplary disk brake pad being described or illustrated, including from the prior art discussed herein.

Such an arrangement is disclosed, for example, in DE 43 32 713 A1 and comprises a radially open well receptacle for disk brake linings which are supported (in a pressed manner) on the brake disk outlet side. A retaining pin for the disk brake linings is releasably mounted in the well window of the fixed-caliper brake housing. In addition to the retaining pin, offset in the direction of the brake disk inlet, a planar, one-piece wire spring bent in an omega shape is clamped in multilaterally between disk brake linings and brake housing above the brake disk in such a way that a rattle-free spring system, including clearance function, is perceived to be particularly economical.

WO 2017036802 A1 discloses an individual clearance spring system for a particularly efficiently designed motor-vehicle fixed-caliper partially lined disk brake. It comprises a supporting pin for drawn friction lining support that is arranged in a fixed manner relative to the housing on the brake disk inlet side, and with a guide pin fixed relative to the housing on the brake disk outlet side, for asymmetrically designed disk brake linings. Four clearance spring arrangements made of wire are fixed in the region of pin receptacles on each friction lining backing plate, clasp the respective pin, and thus apply spring action to the respective friction lining individually in each case.

SUMMARY

A brake with a clearance spring system or of presenting an alternative, more flexibly adaptable floating clearance spring system for a fixed-caliper partially lined disk brake is described herein that allows even more maintenance-friendly and production-oriented interface design, and avoids the disadvantages of the prior art.

A motor-vehicle fixed-caliper partially lined disk brake comprises a separate clearance spring which is present as a simple sheet-steel bow spring and is suitable for receiving a brake disk circumference between spring legs, and wherein the sheet-steel bow spring has a yoke portion which engages radially outwardly, above, over the adjacent assigned friction lining backing plates, and with elastic spring legs which are bent away plastically from the yoke portion substantially in a U shape so as to be offset parallel to one another and which engage behind the friction lining backing plate rear sides on bearing portions, laterally to the friction surface. Accordingly, utilizing a particularly compact flat sheet steel design, a chiplessly produced friction lining restoring spring of sheet-steel bow-type construction that is designed in a production-oriented, loading-appropriate and maintenance-friendly manner and which can be utilized separately in a wear part market for the purpose of service facilitation with value-added function, where appropriate with manufacturer prefabrication as it were as a "cassette" (that is to say installation set).

With a particularly space-saving compact design, the strip-shaped spring legs are oriented substantially parallel to housing legs, substantially orthogonally to a brake piston axis, and are therefore present substantially parallel to friction surfaces of a brake disk. A flat central yoke portion is provided substantially parallel to a housing bridge portion, axially directed thereto, in order to engage over a circumference of a brake disk, and wherein the spring legs are clamped in elastically resiliently between the friction lining backing plates of the disk brake linings in a floating manner via the yoke portion.

Confusion or incorrect mounting is constructively ruled out in that each motor-vehicle fixed-caliper partially lined disk brake has precisely two clearance springs with spring legs which are designed with different lengths and which are adapted to the brake disk inlet side or brake disk outlet side placement, and wherein the two different clearance springs have a restoring spring force tailored identically as far as possible.

A particularly compact design is made possible in that the yoke portion of the two restoring springs is in each case arranged on the brake disk inlet side and brake disk outlet side in separate housing bridge windows.

Since the friction linings of a friction lining set are fixed parallel to one another and relative to one another at a predetermined distance via the clearance springs and nevertheless are mounted elastically in the pin guides in the fixed-caliper brake housing, and wherein the clearance springs are mounted in a form-fitting and captive manner in the fixed-caliper brake housing via the friction linings, a separate housing fixing of the clearance springs is rationalized. In addition, a particularly service-friendly, prefabricated, marketing as wear part kit is made possible.

Each clearance spring in the advantageously slender, and in addition also aerodynamically favorable, flat sheet steel design is present in one piece as a sheet-steel bow spring which has a substantially strip-shaped, flat yoke portion, and with spring legs which are bent away at the end sides of the yoke portion substantially in a U shape so as to be offset parallel to one another and which form a friction lining retaining clip at each end piece, and wherein each friction lining retaining clip serves for fixing between a spring leg and a friction lining in that the friction lining retaining clip clamps in the friction lining backing plate. The stated means makes possible a favorable form- and/or force-fitting fixing between friction lining retaining clip and friction lining backing plate, and wherein a separate fixing, or additional interface, of the clearance spring can be dispensed with.

For their expedient fixing/mounting resolved in a production-oriented manner, each clearance spring has spring legs which are present opposite and parallel to one another, spaced by a predetermined distance, closed back to back, and at least partially opened axially outwardly to receive backing plate bearing projections, and wherein the friction lining retaining clips engage in the manner of a cassette around the backing plate bearing projections on at least three sides.

For example to avoid play, to avoid rattling noises by means of spring action, or with simple tailoring as noise damping measure between friction lining and pin bearing, it is advantageous if each friction lining retaining clip integrates a pocket for the resilient, elastic reception of the retaining or guide pin.

The basic geometry of the clearance spring in the flat compact sheet-steel bow-type design is defined in such a way that spring legs and yoke portion are provided symmetrically to one another along a common alignment/longitudinal axis. Here, the friction lining retaining clips at the end of the spring legs are arranged with uniform axial alignment so as to be offset parallel and at a distance to one another. In other words, the two friction lining retaining clips of each clearance spring are provided in mirror-image fashion to one another with a parallel offset.

A compact as well as high-performance design in the form of a more easily exchangeable service kit, and wherein the necessary installation space of the restoring springs in no way adversely affects the performance capability of the brake is provided. Further details will become apparent from the description with reference to the drawing.

DETAILED DESCRIPTION

Figure 1:
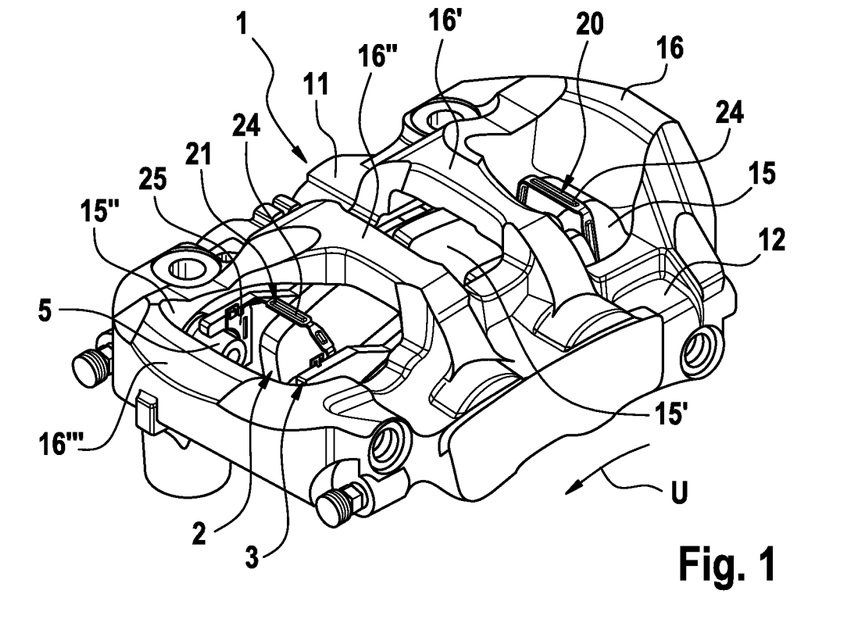
FIG. 1 shows in perspective a reduced basic view of a motor-vehicle fixed-caliper partially lined disk brake according to one or more embodiments.
Figure 2:
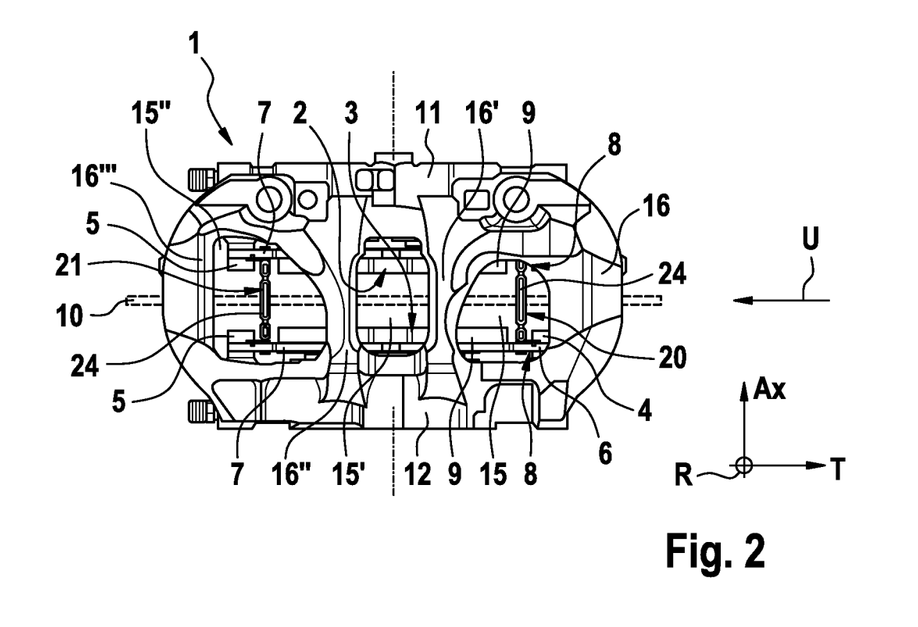
FIG. 2 shows a plan view of the motor-vehicle fixed-caliper partially lined disk brake according to one or more embodiments.
Figure 3:
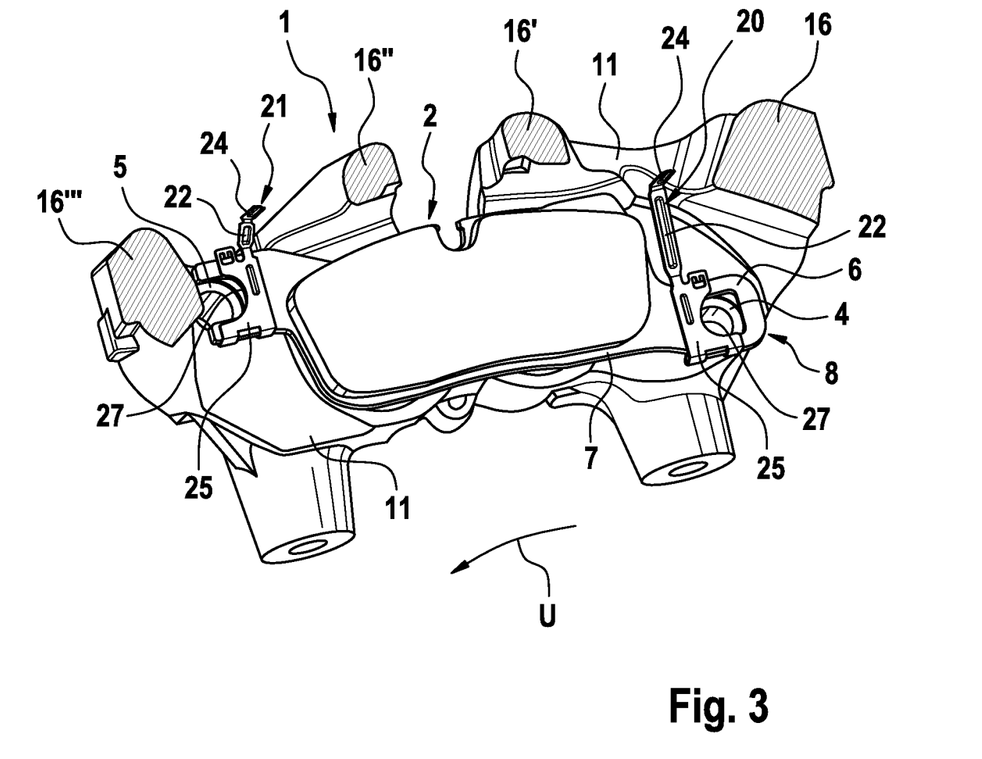
FIG. 3 shows a longitudinal section through the motor-vehicle fixed-caliper partially lined disk brake according to one or more embodiments.
Figure 4:
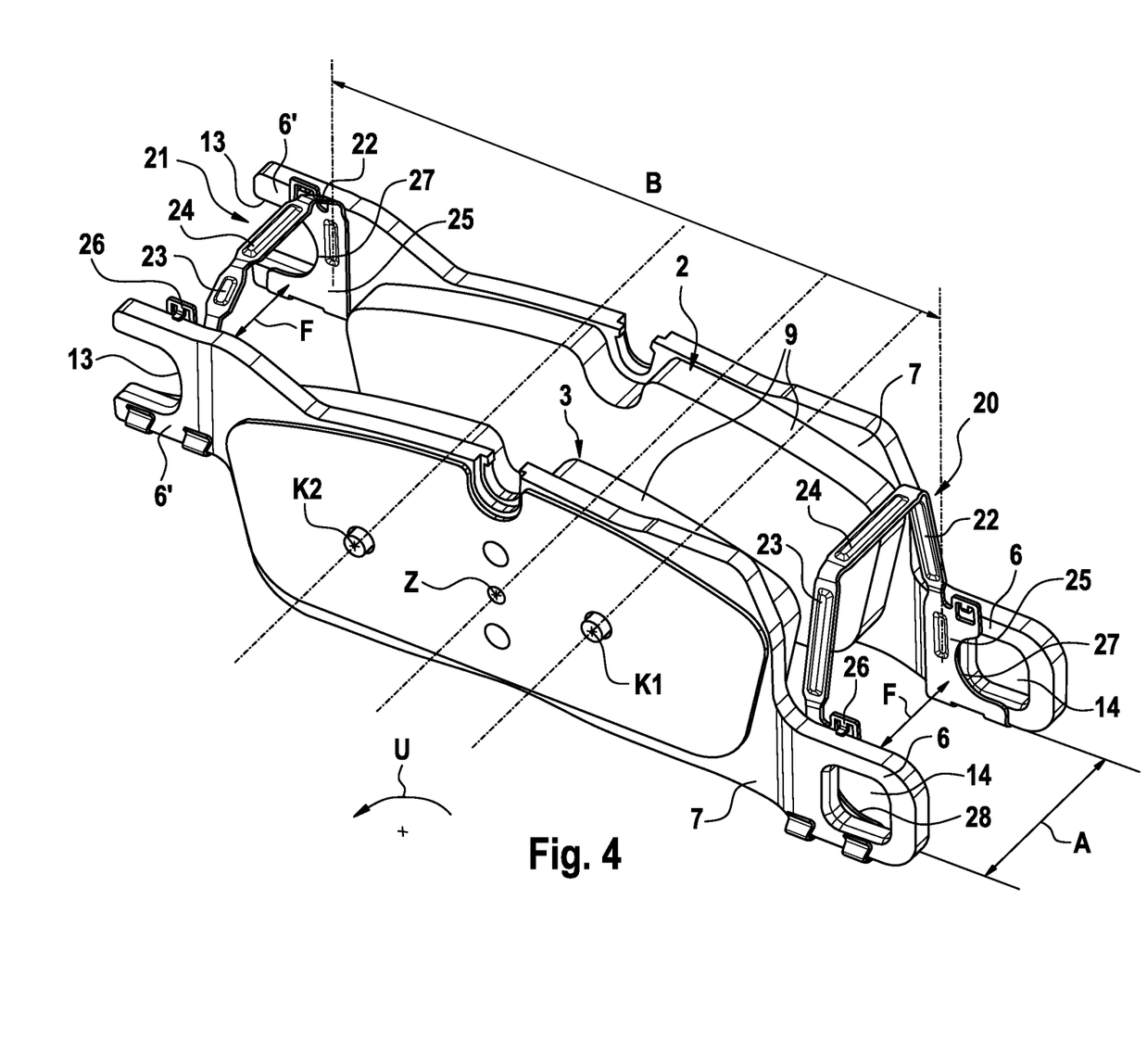
FIG. 4 shows a friction lining installation set, which is preassembled ready for installation, of a motor-vehicle fixed-caliper partially lined disk brake comprising an exchangeable friction lining set with two clearance springs, approximately true to scale.
Figure 5:
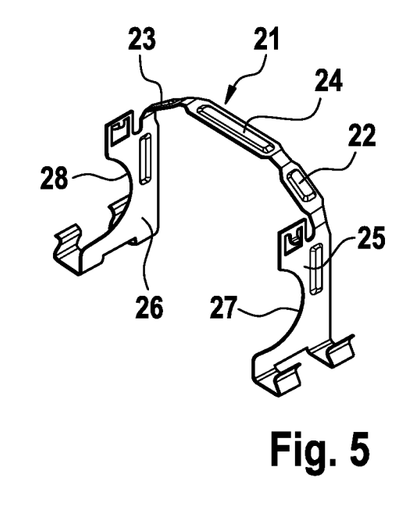
FIG. 5 shows a clearance spring arranged (with the short legs) on the outlet side according to one or more embodiments.
Figure 6:
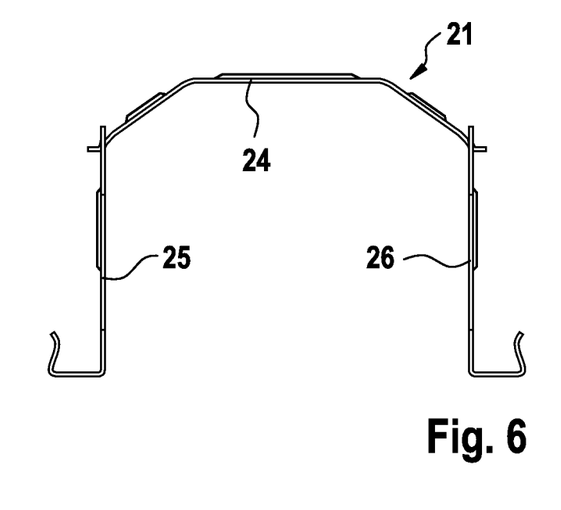
FIG. 6 shows a clearance spring arranged (with the short legs) on the outlet side according to one or more embodiments.
Figure 7:
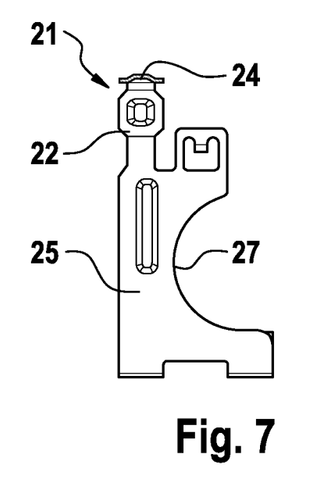
FIG. 7 shows a clearance spring arranged (with the short legs) on the outlet side according to one or more embodiments.
Figure 8:
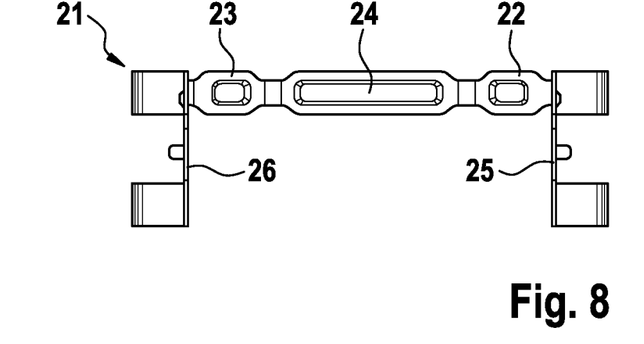
FIG. 8 shows a clearance spring arranged (with the short legs) on the outlet side according to one or more embodiments.
Figure 9:
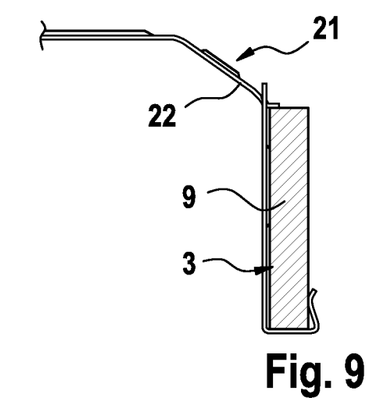
FIG. 9 shows a clearance spring arranged (with the short legs) on the outlet side according to one or more embodiments.

An efficient motor-vehicle fixed-caliper partially lined disk brake 1 comprises, as shown in FIGS. 1-3, friction linings 2, 3 in pin bearings 3 (retaining pin 4, guide pin 5) fixed relative to the housing, wherein the tangential force (braking force) of each friction lining 2, 3 is transmitted, via a backing plate bearing projection 6, 6' emanating from a backing plate 7 of the disk brake lining 2, 3, to a single retaining pin 4 fixed relative to the housing always via a centrally defined predetermined fixed bearing 8 without change of position (with respect to the position of the force introduction after a change of direction of travel). The fixed fixed-bearing allocation takes place both for forward travel and for reverse travel. The backing plate 7 is asymmetrically shaped and carries a sintered friction-material mixture 9 on a front/forward-facing side.

The fixed bearing 8 is allocated on the end face and significantly below the center Z/piston center K1, K2. For the preferential direction of rotation (forward travel) U of a brake disk 10, it is determined that the fixed bearing 8 is placed on the brake disk inlet side and it behaves, correspondingly conversely, for the secondary direction of rotation (rearward travel). In the main direction of rotation (forward travel) U, the backing plate 7 is therefore supported predominantly under tensile loading by the fixed bearing 8 formed. In the reverse direction of rotation (reverse travel), however, the backing plate 7 is supported via the same fixed bearing 8 predominantly under compressive loading of the backing plate 7. The guide pin 5 thus serves always only as a thrust bearing or as a rotation lock for the disk brake lining 2, 3, is substantially free from tangential braking forces, and therefore, in principle, a particularly massive configuration is not required, and the loading of the guide pin 5 is significantly reduced. The efficiency thereof can therefore be increased if its cross section d is made smaller than the cross section of retaining pin 4 and the requirement for material is reduced. To perfect a motor-vehicle fixed-caliper partially lined disk brake 1, it is possible to form the pins 4, 5 on each housing leg 11, 12 in one piece with the housing, that is to say by casting.

A backing plate bearing projection 6' of open configuration in the form of fork prongs, having a jaw opening and a receiving pocket 13 for receiving the guide pin 5, is positioned on the outlet side on the backing plate 7, on the end face opposite to the fixed bearing and radially above the center/friction lining center Z. The open configuration allows simple pivot-in assembly between the housing, together with the guide pin 5, and the disk brake lining 2, 3.

The retaining pin 4, which is substantially circular ring-shaped in cross section, engages through a through-opening 14 in the backing plate bearing projection 6. To reduce normally oriented mutual contact stresses, the contour of the circumferential surface of the through-opening 14 is shaped so as to be curved, hugging the largely circular ring-shaped surface curvature of the retaining pin 4, in such a way that there is contact with as little friction as possible between the retaining pin 4 and the backing plate bearing projection 6 on the one hand, while, on the other hand, there is mounting between disk brake lining 2, 2/backing plate 7 and retaining pin 4 that is as far as possible wear- and weather-resistant and maintenance-free.

The retaining or guide projections 6, 6', which are each provided on one side on each backing plate 7 so as to be offset to one another in an asymmetrical manner, eliminate redundancies through consistent separation of functions. The utilization of the backing plate 7 as a friction lining carrier, i.e. the useful friction area, is improved. This is accompanied by improved scalability between the size of the backing plate 7, the useful friction area and the possible piston supports/number of piston. By means of friction lining support at diametrically opposite locations on the end faces and additionally with a diagonal offset, there is an improvement in the NVH behavior.

The fixed-caliper housing is of open configuration on the bridge side with housing bridge windows 15, 15', 15" in order to allow better through-ventilation and cooling of the wheel brake system. Here, it is possible, in principle, that one or more bridge windows 15, 15', 15" are present in alternation with corresponding bridge portions 16, 16', 16" which interconnect the two housing legs 11, 12. Bridge windows 15, 15', 15" can accommodate spring means (top springs) which are each clamped under radially elastic preload between the backing plate 7 of the disk brake lining 2, 3 and the bridge portion 16, 16', 16", and each allow a radially inwardly or radially outwardly directed elastic preload between the disk brake lining 2, 3 and the housing.

Here, a clearance spring 20, 21 is defined as a sheet-steel bow spring and clamped in elastically between the adjacently mutually opposite friction lining backing plates 7 in a floating manner. By virtue of the compressed U-shaped sheet-steel bow-type design and placement, it is made possible on the one hand that both a purely symbolically illustrated brake disk 10 and the mutually adjacent friction linings 2, 3 are received between spring legs 22, 23 which are bent away so as to be offset parallel to one another, and wherein the axially directed yoke portion 24, which interconnects the spring legs 22, 23, engages in a very space-saving manner radially outwardly both over the brake disk 10 and over the friction linings 2, 3 above a maximized friction radius. The ends of the spring legs 22, 23, which are held flat in principle, form space-saving as well as flat interfaces for the backing plate bearing projections 6, 6' in that they engage behind the friction lining backing plate rear side in the region of the bearing portions, laterally of the brake disk 10. Here, the spring legs 22, 23 are arranged substantially parallel to the housing legs 11, 12 with their actuators (brake pistons), and directed substantially orthogonally to an actuator/brake piston axis in this respect, and substantially parallel to friction surfaces of the brake disk 10.

As is evident from FIGS. 1-3, each motor-vehicle fixed-caliper partially lined disk brake has two clearance springs 20, 21 which are designed in a particularly space-saving manner, which are received in the housing in a space-saving manner and which have spring legs 22, 23 designed to have different lengths, and wherein both clearance springs 20, 21 have a restoring spring force tailored identically as far as possible. An additional space-saving contribution is achieved in that the yoke portions 24 of the two restoring springs 20, 21 are each arranged on the brake disk inlet side and also brake disk outlet side in separate housing bridge windows 15, 15". Therefore, the free design of the motor-vehicle fixed-caliper partially lined disk brake 1 with respect to a substantially maximally utilized brake disk diameter is positively supported in the case of limited wheel rim installation space in a bending-critical region of the bridge portions 16, 16', 16".

The action of clearance springs 20, 21 in their interaction with assigned friction linings 2, 3 is furthermore based on the fact that this friction lining set is arranged elastically in the fixed-caliper brake housing under the restoring spring force F parallel to one another and at a predetermined defined distance A from one another via the clearance springs 20, 21, and wherein the clearance springs 20, 21, without separate fixing, are mounted in a form-fitting and captive manner in the fixed-caliper brake housing via their mounting on the two friction linings 2, 3. Because the clearance springs 20, 21 are basically decoupled from the housing, their restoring efficiency is correspondingly high.

For releasable coupling, the spring legs 22, 23 of each clearance spring 20, 21 have, on an end piece, an advantageous friction lining interface which is formed as a friction lining retaining clip 25, 26, and wherein each friction lining retaining clip 25, 26 serves for fixing between a spring leg 22, 23 and a friction lining 2, 3 in that the friction lining retaining clip 25, 26 clamps in the friction lining backing plate 7. For this purpose, the friction lining retaining clip 25, 26 can at least partially engage around the backing plate 7 in a form-fitting manner. An embodiment provides that the friction lining retaining clips 25, 26 of each clearance spring 20, 21 are present opposite and parallel to one another, spaced by a predetermined distance, closed back to back, and at least partially opened axially outwardly to receive the backing plate bearing projections 6, 6', and wherein each friction lining retaining clip 25, 26 engages in the manner of a cassette around a backing plate bearing projection 6, 6' on at least three sides.

A further adaptation extends to a retaining or guide pin integration in that a friction lining retaining clip 25, 26 has a pocket 27, 28 for the integration of a retaining or guide pin 4, 5. A corresponding configuration or toleration of this integration can make possible the value-added function in that the integration is accompanied by a mutual elastic spring action, and clamping in or the like in the sense of a play or noise avoidance measure between pin and clearance spring 20, 21, including friction lining 2, 3. Therefore, rattling noises in the region of the friction lining mounting are eliminated.

As can be gathered moreover from the drawing, spring legs 22, 23 and yoke portion 24 are provided symmetrically to one another along a common alignment/longitudinal axis, or the friction lining retaining clip 25, 26 is provided so as to be offset in parallel in an axially common alignment/longitudinal axis. Therefore, the two friction lining retaining clips 25, 26 of each clearance spring 20, 21 are provided in mirror-image fashion to one another with a parallel offset.

Figure 10:
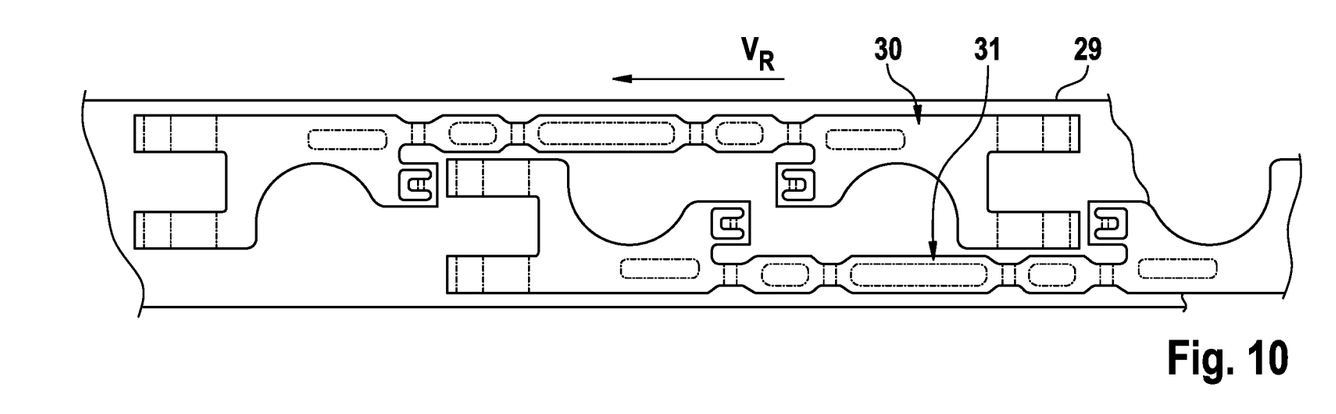
FIG. 10 shows a sheet-steel semi-finished product strip image with projected development of the clearance springs arranged (with the short legs) on the outlet side, approximately true to scale.
Figure 11:
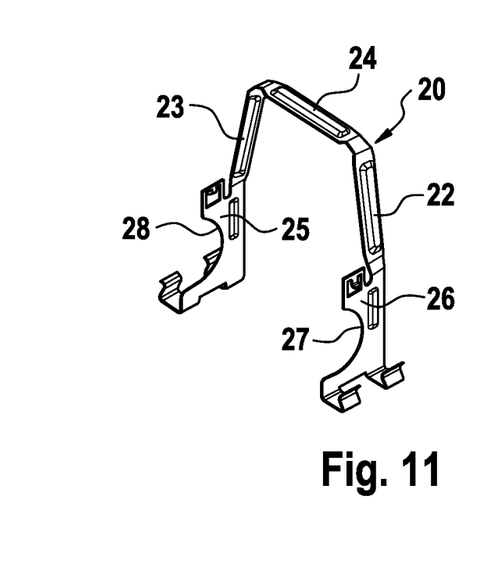
FIG. 11 shows a clearance spring arranged (with the long legs) on the inlet side according to one or more embodiments.
Figure 12:
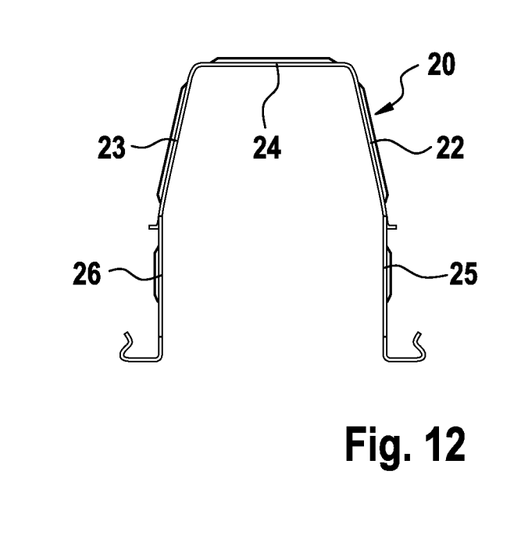
FIG. 12 shows a clearance spring arranged (with the long legs) on the inlet side according to one or more embodiments.
Figure 13:
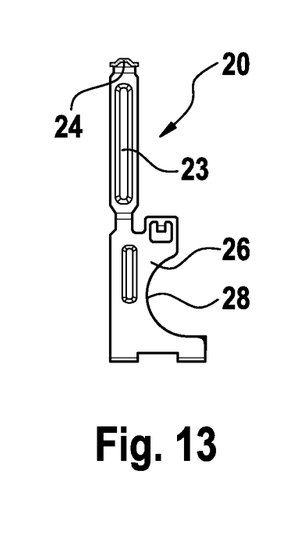
FIG. 13 shows a clearance spring arranged (with the long legs) on the inlet side according to one or more embodiments.

The particularly efficient, production-oriented sheet-metal wastage-reduced, that is to say material-saving economic, configuration of the clearance springs 20, 21 with sheet-metal bow-type design is evident, by way of example, from the blank part developments 30, 31 indicated partially in rudimentary form in projection onto a sheet-steel semifinished product strip 29 according to FIG. 10. This is because the spring development for the different spring blanks that is asymmetrically split in the longitudinal axis L makes possible a, for example, compact and interengagingly offset blank part placement for reduction of sheet-steel stamping waste, as directly emerges from the strip image according to FIG. 10. This advantageous effect is mainly also achieved in that a yoke portion 24 of comparatively long and narrow construction between two friction lining retaining clips 25, 26 for the purpose of wastage avoidance confers the basic possibility to be used for the laterally offset arrangement of other workpiece regions, namely as basis for the production of other friction lining retaining clips, and vice versa. In other words, the provided lateral free space next to a yoke portion 24 in a development/sheet-metal strip image is reserved/utilized for the placement of complementary regions of other blank parts from which, for example, the friction lining retaining clips 25, 26 of other clearance springs are formed. It is possible in particular that all the friction lining retaining clips are constructed to be identical as far as possible in accordance with in principle equally (standard-)dimensioned interfaces on backing plate bearing projections 6, 6', with the result that the different clearance springs 20, 21 differ substantially from one another exclusively through the length of their spring legs 22, 23 or yoke portion 24. Although FIG. 10 is intended to symbolically illustrate two successive, identical developments for forming clearance springs 20 or 21 of identical size, it is possible that, in the semifinished product advancing direction Vr, in each case a large clearance spring follows a small-dimensioned clearance spring in alternation, and vice versa.

The invention claimed is:

1. A clearance spring with two spring legs for elastically resiliently mounted clamping between two adjacent friction lining backing plates of partial-lining disk brake linings of a motor-vehicle partially lined disk brake, wherein the clearance spring is a one piece sheet-steel bow spring which has a yoke portion, and spring legs which are bent away on end sides of the yoke portion in a substantially U shape so as to be offset to one another and which form a friction lining retaining clip on each end and wherein each friction lining retaining clip serves for fixing between one of the spring legs and the friction lining in that the friction lining retaining clip clamps in one of the friction lining backing plates; and
wherein there are two clearance springs for each disc brake.

2. The clearance spring as recited in claim 1, wherein each friction lining retaining clip can be fixed in a form-fitting manner to one of the friction lining backing plates.

3. The clearance spring as recited in claim 1, wherein the friction lining retaining clips of each clearance spring are present opposite and parallel to one another, spaced by a predetermined distance, closed on the back, and at least partially opened axially outwardly to receive backing plate bearing projections, and wherein the friction lining retaining clips engage around the backing plate bearing projections on at least three sides.

4. The clearance spring as recited in claim 1, wherein each friction lining retaining clip has a pocket for integrating a retaining pin or a guide pin.

5. The clearance spring as recited in claim 1, wherein spring legs and yoke portion are provided symmetrically to one another along a common longitudinal axis.

6. The clearance spring as recited in claim 1, wherein the friction lining retaining clips are provided so as to be parallel in relation to a common longitudinal axis.

7. The clearance spring as recited in claim 1, wherein two friction lining retaining clips of each clearance spring is provided in mirror-image fashion parallel to one another.

8. The clearance spring as recited in claim 1, wherein the spring legs are substantially parallel to housing legs, directed substantially orthogonal to a brake piston axis, and substantially parallel to friction linings of the brake disc, and wherein the yoke portion, which is substantially parallel to a bridge section, in order to engage about a circumference of a brake disc, and wherein the spring legs are clamped in a floating manner by the yoke portion between the friction lining back plates of the disc brake linings in a floating manner.

9. The clearance spring as recited in claim 1, wherein there are two clearance springs for each disc brake.

10. The clearance spring as recited in claim 1, wherein the yoke section of the first of the two clearance springs is arranged on the brake disc inlet side and the other is arranged on the brake disc outlet side in separate housing bridge windows.

11. The clearance spring as recited in claim 1, wherein the friction linings are arranged elastically in the brake housing via the clearance springs, parallel to one another and at a predetermined distance from one another, and wherein the clearance springs are mounted in a form-fitting and captive manner in the brake housing via the friction linings.

12. A motor-vehicle partially lined disk brake with pin mounting of adjacent partial-lining disk brake linings:
at least two friction lining backing plates arranged parallel to one another, each having a forward facing side and a rear facing side and having backing plate bearing projections extending from the rear facing side;
a clearance spring, wherein the clearance spring is a sheet-steel bow spring shaped for receiving a brake disk circumference and having a yoke portion, wherein spring legs extending from each end of the yoke portion to form a U-shape, and
friction lining holding clips each formed on ends of the spring legs opposing the yoke portion, wherein the friction lining holding clips engage the spring legs behind the friction lining backing plate on the rear sides of each friction lining backing plate, on the backing plate bearing projections and laterally next to a friction surface;
wherein the clearance spring is elastically resiliently clamped in a floating manner between the friction lining backing plates;
wherein the spring legs are substantially parallel to housing legs, substantially orthogonal to a brake piston axis and substantially parallel to friction surfaces of a brake disk;
wherein the yoke portion is substantially parallel to a bridge portion, axially directed thereto, in order to engage over a circumference of a brake disk;
wherein the spring legs are elastically resiliently clamped in in a floating manner between the friction lining backing plates of the disk brake linings by the yoke portion; and
wherein the motor-vehicle partially lined disk brake has two clearance springs.

13. The motor-vehicle partially lined disk brake as recited in claim 12, wherein the spring legs have different lengths and restoring spring forces equal to one another.

14. The motor-vehicle partially lined disk brake as recited in claim 12, wherein the yoke portion of the two restoring springs is arranged on a brake disk inlet side and a brake disk outlet side in separate housing bridge windows.

15. The motor-vehicle partially lined disk brake as recited in claim 12 wherein friction linings of a friction lining installation set are arranged elastically in the brake housing parallel to one another and at a predetermined distance from one another via the clearance springs, and wherein the clearance springs are mounted in a form-fitting and captive manner in the brake housing via the friction linings.

16. The motor-vehicle partially lined disk brake as recited in claim 12, wherein each friction lining retaining clip has a pocket for integrating a retaining pin or a guide pin.

\* \* \* \* \*